Dec. 13, 1938.  F. J. MINKEL  2,140,477
SAFETY FIXTURE
Filed Aug. 2, 1935  2 Sheets-Sheet 1
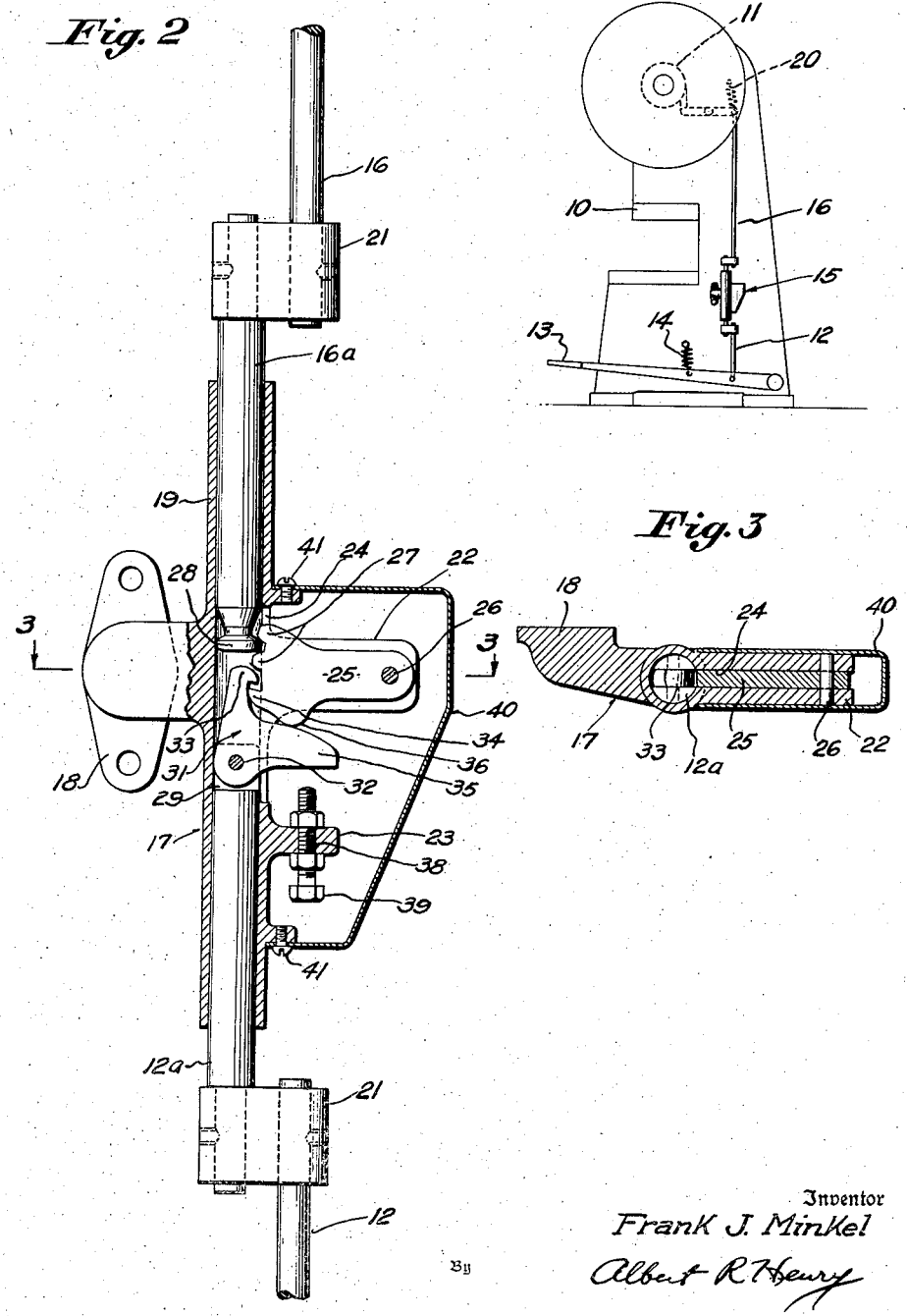
Inventor
Frank J. Minkel
Albert R Henry
Attorney Dec. 13, 1938.　　　　F. J. MINKEL　　　　2,140,477
SAFETY FIXTURE
Filed Aug. 2, 1935　　　　2 Sheets-Sheet 2
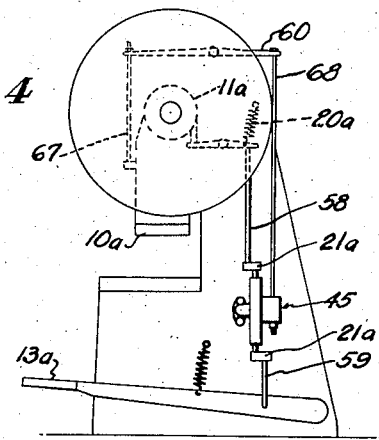
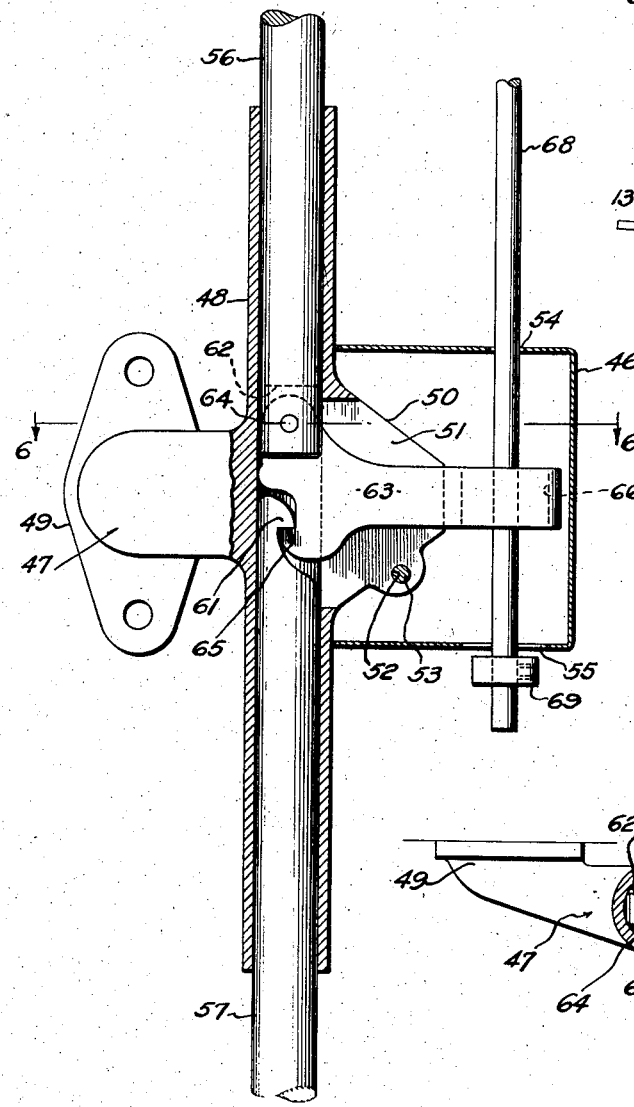
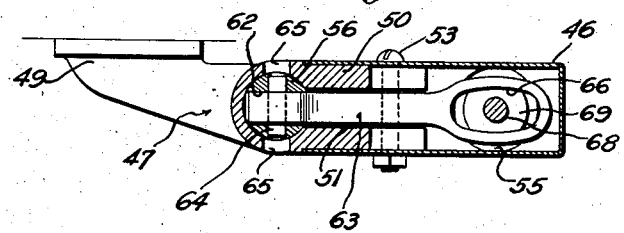
Inventor
Frank J. Minkle
Albert R. Henry
Attorney Patented Dec. 13, 1938

2,140,477

UNITED STATES PATENT OFFICE 2,140,477

SAFETY FIXTURE

Frank J. Minkel, Buffalo, N. Y., assignor to Fedders Manufacturing Company, Inc., Buffalo, N. Y.

Application August 2, 1935, Serial No. 34,403

3 Claims. (Cl. 192—129)

This invention relates to clutch control mechanisms of the repeat stroke preventing type, which are particularly useful with power presses and like machines.

The invention is in the form of a safety coupling which may be connected between the clutch pedal and clutch linkage of a power press or similar machine to provide automatic disengagement of the clutch linkage during actuation of the clutch pedal. Among its several salient features are its simplicity of installation on existing presses, and its few working parts, which operate without the aid of springs or other objectionable structures.

The invention is more specifically described in the accompanying specification and drawings, wherein:

Fig. 1 is a diagrammatic elevation of a power press provided with a safety coupling of a self-disengaging type;

Fig. 2 is a vertical section through the coupling;

Fig. 3 is a section on the line 3—3 of Fig. 2;

Fig. 4 is a diagrammatic view of a power press having a safety coupling controlled by the ram of the press;

Fig. 5 is a vertical section through the coupling of Fig. 4;

Fig. 6 is a section on the line 6—6 of Fig. 5 with the latch shown in elevation.

In Fig. 1 the invention is shown applied to a conventional power press which, as is well understood in the art, is provided with a motivated element or ram 10 operated by the motive elements of the press through a clutch 11. The clutch in turn is controlled by a suitable linkage system terminating in a clutch rod 12 and a connected pedal 13, by means of which the operator may obtain the continuous operation of the ram as long as the pedal is depressed. The pedal is retained in a raised position by a spring 14.

The invention provides a means for automatically uncoupling the clutch after each stroke of the ram, thus insuring but one stroke thereof per each actuation of the pedal, and it consists of a coupling unit 15 which is secured to the press and which, as hereinafter described, contains a mechanism for connecting the clutch rod 12 with a rod 16 or similar mechanism forming part of the clutch linkage. A spring 20 retains the rod 16 in a normally raised position.

The unit comprises a body 17 having a bracket portion 18 which is secured to the body of the press, and a vertical cylindrical bearing portion 19 for slidably receiving coupling rods 16a and 12a which are connected to the rods 16 and 12 respectively by connecting members 21. An arm 22 and a spaced lug 23 are formed on the body 17 in opposed relation to the bracket portion 18.

The arm 22 and the adjacent section of the bearing portion 19 are slotted as indicated by the numeral 24 to receive a segment gear 25, which is mounted for pivotal movement on the arm by a pin 26. The teeth 27 of the gear mesh with a circular tooth 28 formed on the extremity of the coupling rod 16a.

The extremity of the rod 12a is slotted, as indicated by the numeral 29, to receive a latch 31 which is pivotally mounted on the rod by a pin 32. The upper end of the latch is formed with a tooth 33 which is engageable with a latch tooth 34 formed on the segment gear 25. The latch 31 is also formed with an integral angular arm 35 which protrudes through the slot 24, and which is engageable with a stop portion 36 formed on the segment gear. The arm 35 acts as a counterbalance to cause rotation of the latch and the engagement of the teeth 33 and 34 when the rod 12a is in its raised position, as shown, while the stop portion 36 insures such movement if it has previously been arrested for any reason.

The lug 23 contains a drilled hole 38 for mounting an adjusting screw 39 which is positioned in the path of the latch arm 35. A sheet metal casing 40 is formed to enclose the projecting mechanism, and it is secured to the body 17 by screws 41.

In the drawings, the inoperative position of the mechanism is shown, wherein the pedal 13 is in raised position, and the latch 31 is in engagement with the segment gear 25. When the pedal is depressed by the operator, the rod 12a is moved downward in its bearing, and the segment gear 25 is rotated in a counter-clockwise direction, thus carrying with it the rod 16a. This movement causes the actuation of the clutch linkage, the engagement of the clutch, and the resultant actuation of the ram 10. Before the completion of the pedal movement, however, the latch arm 35 strikes the screw 39, whereupon the latch is tripped and disengaged from the segment gear 25, which, with the associated rod 16a and clutch linkage, is rapidly raised by the spring 20 to disengage the clutch before the completion of the upward stroke of the ram. Thus, if the operator carelessly retains the pedal in its depressed position, he incurs no danger of a second accidental stroke of the ram.

When the pedal is released, the spring 14 raises it and the accompanying rod 12a, during which movement the latch 31 is first caused to move to the right about the curved face of the gear tooth 34 and then to the left and into engagement with the gear tooth by the gravitational effect of the latch arm 35. In this position, the mechanism is reset for a subsequent operation of the pedal, as previously described.

In adapting the so-called high speed presses for single stroke performance, it has been found advisable to provide a mechanically actuated disengaging means for the coupling. Figs. 4-6 show a coupling 45 of this type which is otherwise generally similar to the described embodiment.

The coupling 45 includes a mounting body 47 having a cylindrical bearing portion 48 formed with integral and opposed securing bracket and arm portions 49 and 50. The arm and bearing portions are slotted as indicated by the numeral 51, and the arm portion additionally contains a transverse hole 52. A protective casing 46 encloses the arm portion and it is secured thereto by a bolt 53 which extends through the hole 52. Vertically aligned holes 54 and 55 are formed in the upper and lower walls respectively of the casing.

The bearing portion 48 slidably receives rods 56 and 57 which are secured to rods 58 and 59 respectively by connecting members 21a. The rod 58 provides a connection with the linkage of the clutch 11a, while the rod 59 is connected to the clutch pedal 13a (Fig. 4) in the same manner as the corresponding rods described in the first embodiment. The lower rod 57 is formed with an integral latch tooth 61, while the upper rod 56 contains a slot 62 for receiving an extremity of a latch 63 which is subsequently pivotally secured therewith by a pin 64. Clearance holes 65 are formed in the bearing portion 48, and they permit access to the pivotal connection for assembly and disassembly of the pin 64 (Fig. 6).

The latch is formed with a tooth 65 immediately below the pivotal connection, and the opposite extremity of the latch is provided with a vertical opening 66.

During the release, spring actuated, stroke of the pedal 13a, it will be apparent that the tooth 61 of the rod 57 will engage the rounded portion of the latch tooth 65 to force the latch upward; and that subsequently the teeth will be engaged through the return gravitational movement of the latch. Upon depressing the pedal, the coupled rods will move in unison and the clutch will accordingly be actuated.

The latch is disconnected during or immediately after this movement by a linkage, including a lever 60 pivoted on the press body and having one extremity connected to the ram 10a of the press by a cable 67 and the other extremity connected to a rod 68. The rod 68 extends downward through the holes 54, 55 of the casing, and the slot 66 of the latch, and its free extremity receives a suitable abutment such as an adjustable collar 69.

During the downward movement of the ram, the lever 60 is actuated through the cable connection, and it lifts the rod 68, which in turn causes the engagement of the rod collar 69 with the latch, to lift the latch and thereby disconnect the rods 56 and 57. As in the first embodiment, the upper rod is then released for upward movement by the clutch linkage spring 20a, and the clutch is accordingly released. Thus, regardless of the speed of the press and the speed of movement of the clutch pedal, but a single stroke of the ram is obtained, as the clutch release is directly controlled by and during the power stroke of the ram.

If it is desired to utilize the last described embodiment of the invention for a slow speed press, the ram linkage and the rod 68 may be dispensed with, whereby an automatic disengagement of the latch is obtained by the engagement of the latch with the bolt 53.

It is intended that the embodiments heretofore described be utilized in numerous fashions in any of the power presses and similar machines now in use, and it will therefore be apparent that the invention is not limited to the clutch and ram linkages specifically shown herein.

I claim:

1. In a machine having a clutch operating mechanism and a clutch pedal, a safety mechanism comprising a fixed body having a bearing portion, a rod slidably mounted in the bearing portion and formed with a tooth at one extremity, said rod being connected to the clutch operating mechanism, a segment gear mounted on the body and meshing with said tooth, a second rod mounted in the bearing portion and connected to the clutch pedal, a latch connection between the second rod and the segment gear, and fixed means on the body for disengaging the latch connection upon predetermined movement of the second rod.

2. In a machine having a clutch operating mechanism and a clutch pedal, a safety mechanism comprising a fixed body having a bearing portion, a rod slidably mounted in the bearing portion and formed with a tooth at one extremity, said rod being connected with the clutch operating mechanism, a segment gear mounted on the body and meshing with said tooth, a second rod mounted in the bearing portion and connected to the clutch pedal, a latch pivotally mounted on the extremity of the second rod and engageable with said segment gear, an arm on the latch for gravitationally effecting the engaging movement of the latch, and fixed means on the body engageable by the latch arm to disengage said latch.

3. In a machine having a clutch operating mechanism and a clutch pedal, a safety mechanism comprising a fixed body having a bearing portion containing a slot in the wall thereof, a pair of rods slidably mounted in the bearing portion, a latch connection between the meeting ends of the rods in the bearing portion including a latch pivotally secured to one of the rods and extending through the slot in the bearing portion, said rods being connected to the operating mechanism and clutch pedal respectively, and means on the body exterior of the bearing portion for engaging the protruding portion of the latch to release the latch connection.

FRANK J. MINKEL.